Dec. 28, 1943.  P. R. FRANCIS  2,337,850
BEARING OILER
Filed Nov. 3, 1941  3 Sheets-Sheet 1

INVENTOR.
PAUL R. FRANCIS.
BY
ATTORNEY.

Dec. 28, 1943.　　　P. R. FRANCIS　　　2,337,850
BEARING OILER
Filed Nov. 3, 1941　　　3 Sheets-Sheet 2
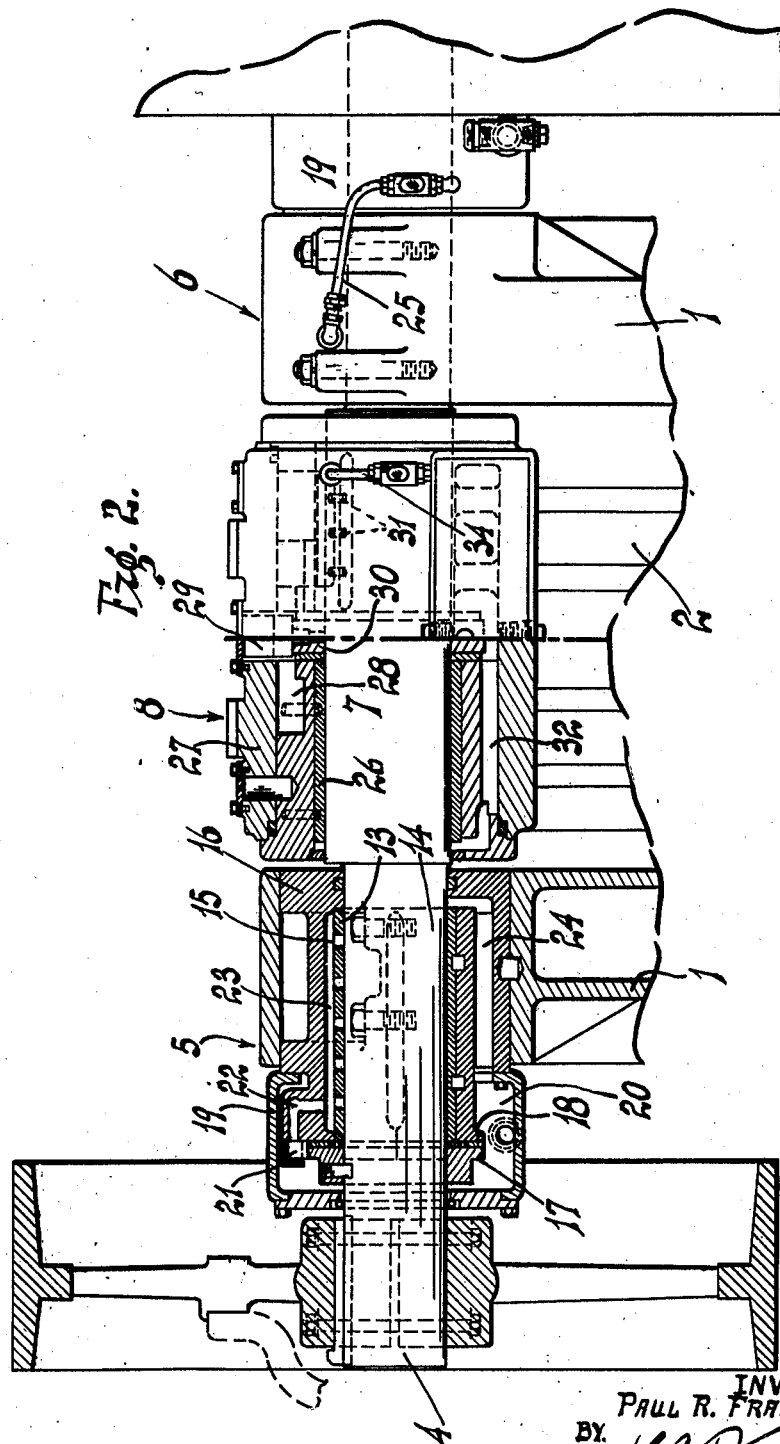
INVENTOR.
PAUL R. FRANCIS.
BY
ATTORNEY.

Dec. 28, 1943.  P. R. FRANCIS  2,337,850
BEARING OILER
Filed Nov. 3, 1941   3 Sheets-Sheet 3
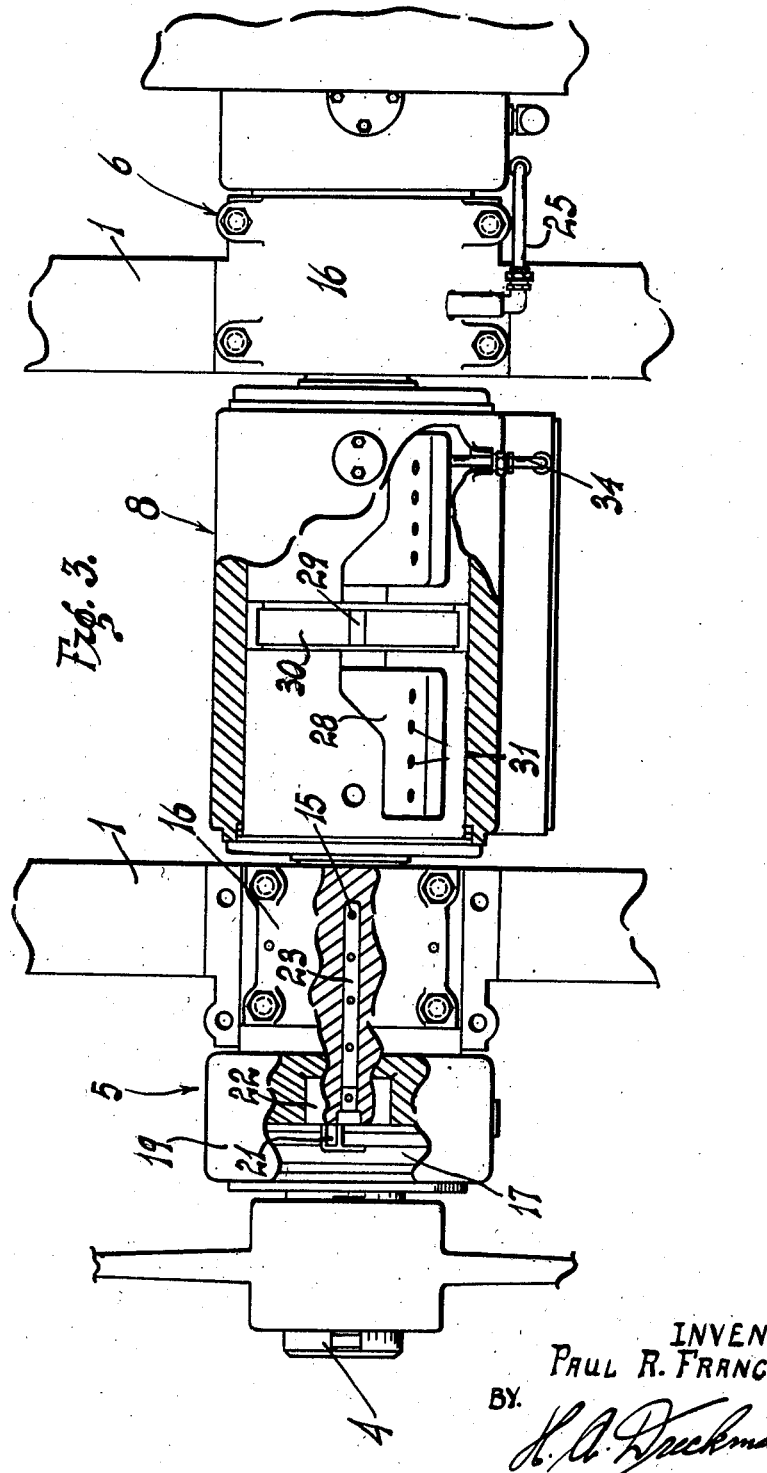
INVENTOR
PAUL R. FRANCIS.
BY
ATTORNEY.

Patented Dec. 28, 1943

2,337,850

UNITED STATES PATENT OFFICE 2,337,850

BEARING OILER

Paul R. Francis, Los Angeles, Calif., assignor to Alloy Steel & Metals Company, Inc., Los Angeles, Calif., a corporation of California Application November 3, 1941, Serial No. 417,633

2 Claims. (Cl. 308—127)

This invention relates to a bearing oiler particularly applicable to heavy machinery such as crushers, conveyors, separators, and the like, although my bearing oiler construction can also be used on light machinery.

An object of my invention is to provide a novel bearing oiler wherein the construction of the bearing and oiler is such that the journal will be effectively oiled.

Another object of my invention is also included in the construction of the bearing, namely, the means to absorb the end thrust of the bearing.

Still another object of my invention is to provide a novel bearing oiler in which the overflow of oil to the bearing is returned to the sump through a flow indicator, thus enabling the operator to determine whether the bearing is receiving oil.

A feature of my invention resides in the novel and simple construction of the oiler and the bearing, thus providing a bearing which is eminently successful when used on heavy machinery and the like.

Another feature of my invention resides in the arrangement of admitting the oil near the top of the bearing and just ahead of the load zone, thus insuring a supply of oil to the bearing, especially in the load zone thereof.

Other objects, advantages and features of invention may appear from the accompanying drawings, the subjoined detailed description and the appended claims.

In the drawings

Figure 2 is a fragmentary side elevation of a jaw crusher with parts broken away to show interior construction, the bearings for the eccentric shaft including my oiling means.

Figure 3 is a fragmentary plan view of a jaw crusher with parts broken away to show interior construction, and particularly the parts of the bearing oiler for the main and eccentric bearings of the eccentric shaft.

Figure 1:
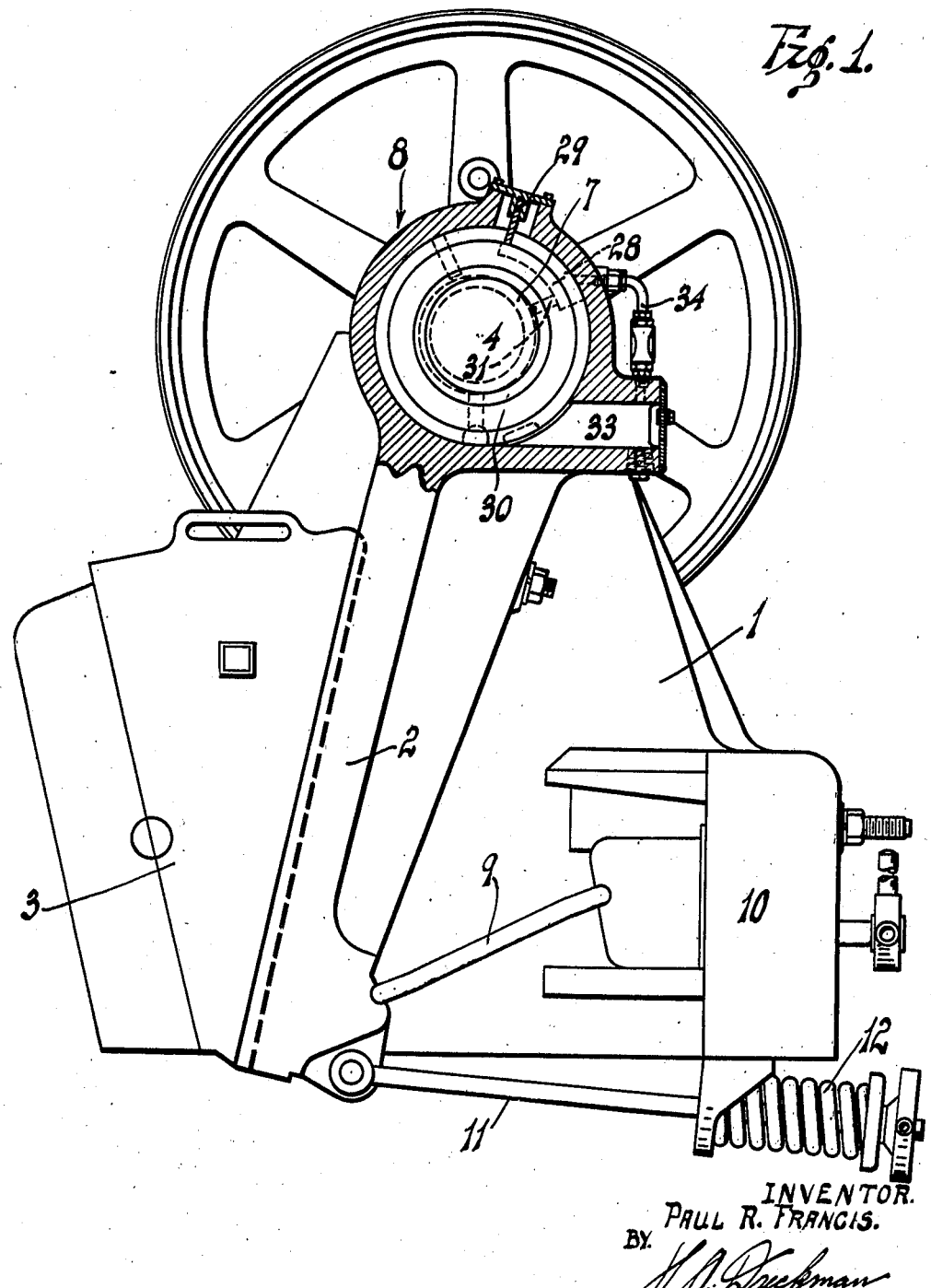
Figure 1 is a side elevation of a jaw crusher with parts broken away to show my bearing oiler mounted thereon.

While I have here illustrated my bearing oiler on a jaw crusher, it is obvious that the oiler can be applied to other types of equipment and machinery.

Referring more particularly to the drawings, the numeral 1 indicates a frame of the machine. This particular jaw crusher on which my bearing is mounted includes a moveable jaw 2 and a fixed jaw 3. An eccentric shaft 4 is journaled on the frame 1 in main bearings 5 and 6 and the eccentric 7 of the shaft is surrounded by a bearing 8 on the moveable jaw 2. The construction of the bearings 5, 6 and 8 will be subsequently described in detail. The moveable jaw 2 of the crusher is supported at its lower end on a toggle 9 which is adjustably mounted in a frame member 10 and also on a link 11 which is spring pressed by means of a spring 12. The details of construction of the jaw crusher are usual and well known, and these particular details form no part of my invention.

The main bearings 5 and 6 are identical in construction, and only one will be described in detail.

A split, or tubular, bushing 13 surrounds the journal 14 of the shaft 4. A plurality of oil holes 15 extend through the bushing and permit oil to flow on to the journal 14 of the bearing. A bearing housing 16 is mounted on the frame 1 by suitable means such as studs, or the like. A thrust collar 17 is fixedly attached to the shaft 4 at the outer end of the bushing 13. This thrust collar is pinned, threaded, doweled, or otherwise fixedly attached to the shaft. A thrust washer 18 is arranged between the outer end of the bushing 13 and the inner face of the collar 17. By this means I provide an effective end thrust for the bearing. A cage 19 is mounted on the end of the bearing housing 16 and surrounds the shaft 4, substantially as shown. This cage includes the sump 20 in which a quantity of oil is maintained. The level of the oil is such that the collar 17 constantly dips into it, and as it is rotated with the shaft 4, oil will adhere to the periphery of the collar and carry this oil upwardly. A scraper finger 21 is fixedly mounted on the bearing housing 16 which scrapes on the periphery of the collar 17, thus scraping off the oil on the collar and conducting this oil into the intake passage 22 in the bearing housing 16. The intake passage 22 extends to a horizontal feed duct 23, also in the housing 16. The duct 23 distributes oil to the holes 15 which thus feed the oil to the journal 14. Excess oil gathers in the return duct 24 which is formed in the bearing housing 16 and extends to the sump 20. Excessive oil is returned to the sump 20 through a flow indicator 25 which is connected to the passage 23 at one end and the sump 20 at the other.

The oiling means for the eccentric bearing 8 is identical to the oiling means previously described in all essential details. The eccentric bearing is here constructed in two halves, that is, left and right. A bushing 26 surrounds the eccentric 7. A bearing cap, or housing, is also provided, and this housing has an intake passage 28 which receives oil from the finger 29, said finger scraping the thrust collar 30 in the same manner as previously described. The bushing 26 is provided with a plurality of oil holes 31 which extend to the eccentric 7 to oil the same. A return duct 32 in the housing 27 returns the oil to the sump 33 which may also be formed in the housing. Excess oil is returned to the sump through the flow indicator 34. This flow indicator extends from the intake passage 28 and thence to the sump 33, substantially as shown.

It will be noted that in the case of the eccentric bearing, the intake passage 28 is arranged adjacent the top of the bearing and just in advance of the load zone so that the oil will enter the journal just in advance of the load zone, thereby insuring an adequate supply of oil to the journal. The oil packings for the various bearings are usual and well known.

Having described my invention, I claim:

1. A bearing oiler comprising a housing, a shaft extending into the housing, a sleeve mounted in the housing and surrounding the shaft, a cage removably mounted on one end of the housing, the lower portion of said cage forming a sump, a collar mounted on the shaft, said collar extending into the sump, a scraper engaging the collar, said housing having an intake passage formed therein and receiving oil from the scraper, and a distributor duct formed in said housing over the sleeve and extending from the intake passage longitudinally of the sleeve, said sleeve having holes extending therethrough for admitting oil to the shaft journal, and said housing having a return duct therein extending downwardly from the shaft at the inner end of the sleeve and along the under portion of the sleeve to the sump.

2. A bearing oiler comprising a housing, a shaft surrounded by the housing and rotatable therein, a sleeve non-rotatably mounted in the housing and surrounding the shaft, a cage surrounding the shaft and removably mounted on one end of the housing, the lower portion of said cage forming a sump, a collar fixed to said shaft within said cage between the outer side of the cage and the confronting ends of the housing, said collar having its lower portion extending into the sump, a scraper carried by said housing and engaging the upper portion of the collar, said housing having an intake passage formed in its upper portion in position for receiving oil from the scraper and a distributor duct in the housing extending from the intake passage over the upper portion of the sleeve, said distributor duct extending longitudinally of the sleeve and the housing, said sleeve having holes therein admitting oil from the distributor duct to the shaft journal, said housing also having a return duct therein extending longitudinally in said housing under the sleeve from the inner end of the shaft to the sump, and a conduit for surplus oil leading from the distributor duct to the return duct and having a visible flow indicator intermediate its length.

PAUL R. FRANCIS.